US007013189B2

(12) United States Patent
Weber

(10) Patent No.: US 7,013,189 B2
(45) Date of Patent: Mar. 14, 2006

(54) METHOD FOR AUTOMATICALLY PREPARING A WORKING PLAN

(76) Inventor: Helga Weber, Elritzenweg 3, Erlangen (DE) 91056

( * ) Notice: Subject to any disclaimer, the term of this patent is extended or adjusted under 35 U.S.C. 154(b) by 518 days.

(21) Appl. No.: 10/297,975

(22) PCT Filed: Jun. 2, 2001

(86) PCT No.: PCT/DE01/02088

§ 371 (c)(1),
(2), (4) Date: Dec. 12, 2002

(87) PCT Pub. No.: WO01/97093

PCT Pub. Date: Dec. 20, 2001

(65) Prior Publication Data
US 2003/0181997 A1    Sep. 25, 2003

(30) Foreign Application Priority Data
Jun. 13, 2000   (DE) ............................... 100 29 086

(51) Int. Cl.
G06F 19/00   (2006.01)
G06F 17/50   (2006.01)
(52) U.S. Cl. ....................................... 700/97; 700/103
(58) Field of Classification Search .................. 700/97, 700/103
See application file for complete search history.

(56) References Cited

U.S. PATENT DOCUMENTS 5,168,441 A      12/1992   Onarheim et al.
5,249,135 A  *   9/1993    Fujita .......................... 700/179
5,777,877 A      7/1998    Beppu et al.
5,793,638 A      8/1998    Yao et al.
RE36,602 E   *   3/2000    Sebastian et al. ............. 700/97
6,633,788 B1 *  10/2003    Riley et al. .................... 700/97

FOREIGN PATENT DOCUMENTS

DE      198 07 343 A1   9/1998
DE      197 40 974 A1   3/1999
EP      0 992 869 A2    7/1998

* cited by examiner

Primary Examiner—Leo Picard
Assistant Examiner—Steven R. Garland
(74) Attorney, Agent, or Firm—Rankin, Hill, Porter & Clark LLP

(57) ABSTRACT

A method for automatically preparing a working plan for producing a product having several components. The method involves the following steps: a) providing a product data model of the product, in which each component is described by a partial data set containing a classification characteristic; b) preparing a database, whereby the data sets contained therein are divided into classes according to the classification characteristic, whereby each class contains one or more selection rules, whereby a manufacturing partial process provided with an index is assigned to each selection rule, and each manufacturing partial process contains one or more working cycles; c) automatically selecting the class applying to the component by using the classification characteristic; d) automatically selecting a manufacturing partial process suited for producing the component by using the selection rule; e) automatically establishing the sequence of the manufacturing partial processes by using the respective index.

9 Claims, 2 Drawing Sheets

METHOD FOR AUTOMATICALLY PREPARING A WORKING PLAN

The invention relates to a method for automatically preparing a working plan for producing a product comprising a number of components, for example a wiring harness. It also relates to a device for carrying out the method.

Most products comprise a multiplicity of components. For example, the wiring harness of a motor vehicle comprises a multiplicity of cables provided with different color codes. Attached at the ends of the cables there may be connectors of various forms, which for their part are in turn formed by component parts, such as a contact shoe and an insulation enclosing the contact shoe. For each component it is necessary to establish the type and sequence of the respective working operations. The result is an element-specific partial manufacturing process. Finally, it is necessary to establish the sequence of the partial manufacturing processes.

It is generally known to prepare a working plan for producing a product. The working plan describes the type and sequence of the individual partial manufacturing processes required for producing the product. The selection of the partial manufacturing processes or working operations depends on the available resources, for example machines. The working plan has the aim of specifying a manufacturing process for the product to be produced which saves as much as possible in terms of cost and time.

At present, a working plan is prepared manually with the aid of computer programs. In this case it is necessary to produce a data set which is specific to the respective computer program and describes the characteristics of the product to be produced program-specifically. This operation requires experienced, technically trained personnel; it is consequently time-consuming and costly. The working plans prepared using conventional computer-aided methods are often imprecise. As a result, the production costs for the product increase.

A method for planning the manufacture of a set of dies for a pressing machine is known from DE 198 07 343. In this case, data of the product to be manufactured will be compared with data of previously planned products. Depending on the similarity of the data compared, suitable manufacturing steps are then selected. The method has the disadvantage that the same manufacturing means always have to be kept available. If the manufacturing means change, under some circumstances the predetermined similarity relationships also no longer coincide.

According to the prior art, it is also known to design new products on a computer using CAD programs. The CAD data sets prepared by means of such programs are suitable, for example, for controlling computer-controlled machines. Using the CAD data sets, it is possible, for producing a prototype, to produce components of the product directly, for example by machining.

U.S. Pat. No. 5,249,135 describes a computer-aided method of producing a component of a product. In this case, the manufacturing steps of a component are planned on the basis of a model of the part. The known method is not suitable for automatically preparing a working plan for producing a product comprising a number of components.

It is an object of the invention to eliminate the disadvantages of the prior art. It is intended in particular to provide a method for selecting and determining the sequence of working operations which can be carried out simply and at low cost. It is a further aim to lower the manufacturing costs for a product.

This object is achieved by the features of claims 1 and 9. Expedient configurations emerge from the features of claims 2 to 8.

According to the invention, a method for automatically preparing a working plan for producing a product comprising a number of components, for example a wiring harness, is provided with the following steps:
- a) providing a product data model of the product, in which each component is described by a partial data set containing a classification characteristic,
- b) preparing a database, the data sets contained therein being divided into classes according to the classification characteristic, each class containing one or more selection rules, each selection rule being assigned a partial manufacturing process provided with an index, and each partial manufacturing process containing one or more working operations,
- c) automatically selecting the class applying to the component on the basis of the classification characteristic,
- d) automatically selecting a partial manufacturing process suitable for producing the component by means of the selection rule,
- e) automatically establishing the sequence of the partial manufacturing processes on the basis of the respective index.

DEFINITIONS

Working plan: step-by-step description of the manufacturing process for a product. The working plan comprises successive partial manufacturing processes.

Product: physical object which comprises a number of components.

CAD data model: data model which has been prepared for designing the product by means of a CAD program. The CAD data model comprises partial data sets which describe the components of the product.

Product data model: data model in which the partial data sets of a CAD data model are assigned characteristics which are relevant for the manufacturing process, i.e. influence the selection of a suitable partial manufacturing process and/or the calculation of the likely machining times.

Database: knowledge base; it comprises data sets which respectively form a class. The data sets comprise the selection rule, the possible machining steps, the computing specifications for calculating the machining times and the like.

Classification characteristic: characteristic which makes it possible to assign a partial data set to a predetermined class.

Index: ordinal number for establishing the sequence of the partial manufacturing processes in the working plan.

Partial manufacturing process: sequence of working operations, each working operation being assigned a unique key and/or a text, a resource and the manufacturing time.

The method according to the invention makes it possible to specify an optimized working plan in a simple and quick manner. The manufacturing costs for the product can consequently be lowered. By means of the method according to the invention, working plans for a number of manufacturing sites can be quickly prepared and it can be ascertained by comparison at which of the manufacturing sites the product can be produced at lowest cost.

The classification characteristic may be a material-specific characteristic. A material-specific characteristic is chosen as a classification characteristic in particular whenever the product consists of different materials. If the product is formed from one material which can be machined by one and the same machine, other characteristics, for example geometrical characteristics, may also be used as classification characteristics.

Geometrical data and characteristics contained in the partial data set are advantageously processed by means of the selection rule. This makes it possible to calculate particularly exactly in advance the working time to be expended for the respective working operation.

The partial manufacturing processes stored in the database are expediently checked one after the other hierarchically with decreasing complexity for the selection of a suitable partial manufacturing process.

This reduces the computing time and makes the method particularly efficient.

Each partial manufacturing process may comprise a number of working operations and the expenditure of time for the working operation can be calculated by means of data or a computing specification predetermined for each of the working operations.

According to a further configurational feature, each partial manufacturing process is assigned at least one working means and a text. A working plan showing the sequence of the ascertained partial manufacturing processes, the working means required for the partial manufacturing processes and the expenditure of time required for the respective partial manufacturing process can be output as the result on a screen, as a file or in printed form.

It is particularly advantageous for transactions which simulate the manual preparation of a working plan with the aid of conventional business management software to be derived automatically from the ascertained partial manufacturing processes.

Conventional business management software is understood as meaning product-planning and control systems. Such systems or computer software is sold the company SAP AG, for example. To make it easier for the user of such systems, a possibility for comparison is provided. There is no need for complex retraining schedules or instructions to operate the method according to the invention.

The invention also relates to a device for data processing, set up for carrying out the method according to the invention. It may be a conventional personal computer, which is provided with a program for automatically carrying out the method according to the invention.

BRIEF DESCRIPTION OF THE DRAWINGS

An exemplary embodiment of the invention is explained in more detail below on the basis of the drawing, in which.

DETAILED DESCRIPTION OF THE PREFERRED EMBODIMENTS

Figure 1:
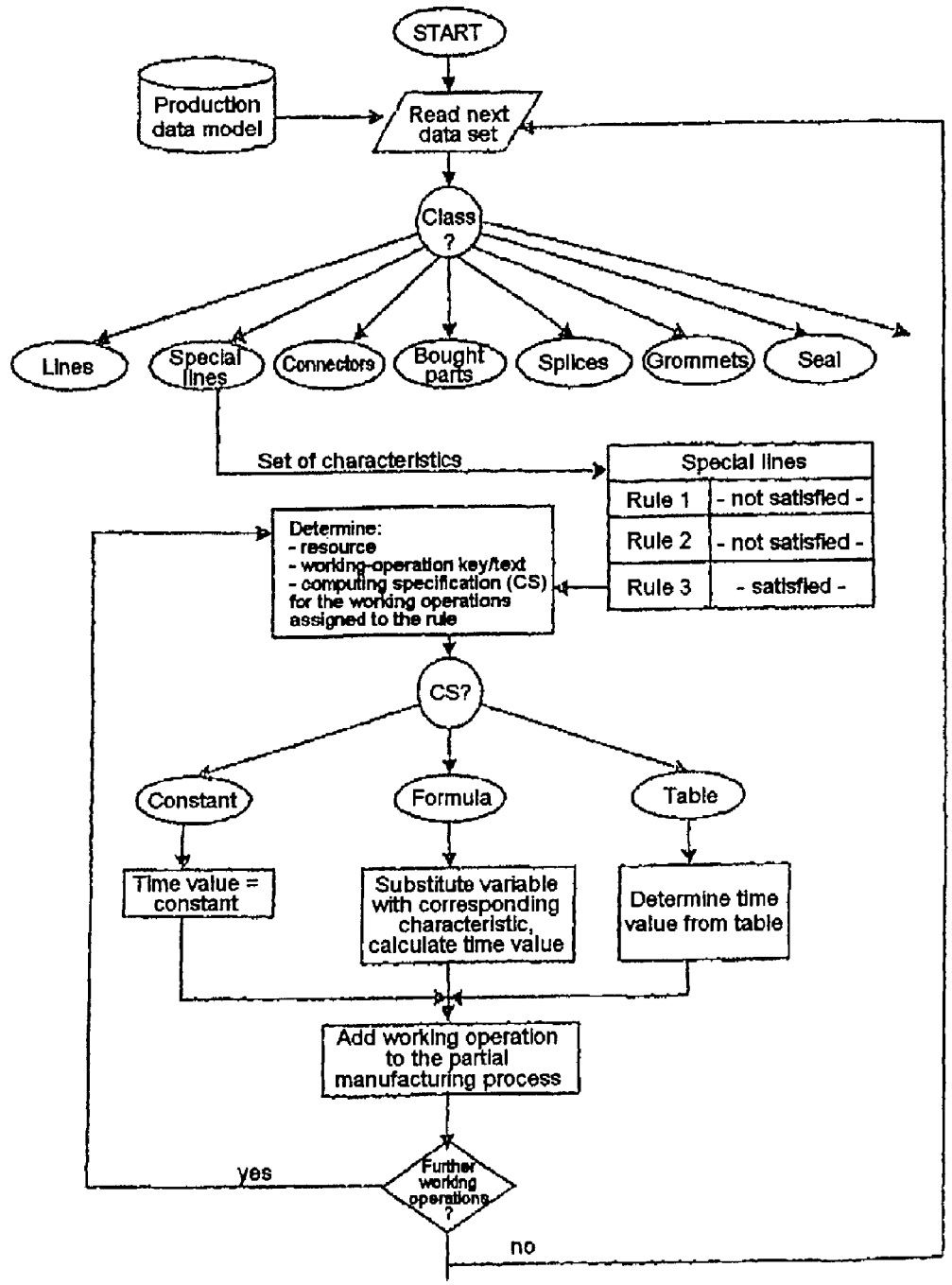
FIG. 1 shows a first flow diagram and
FIG. 2 shows a second flow diagram.
Figure 2:
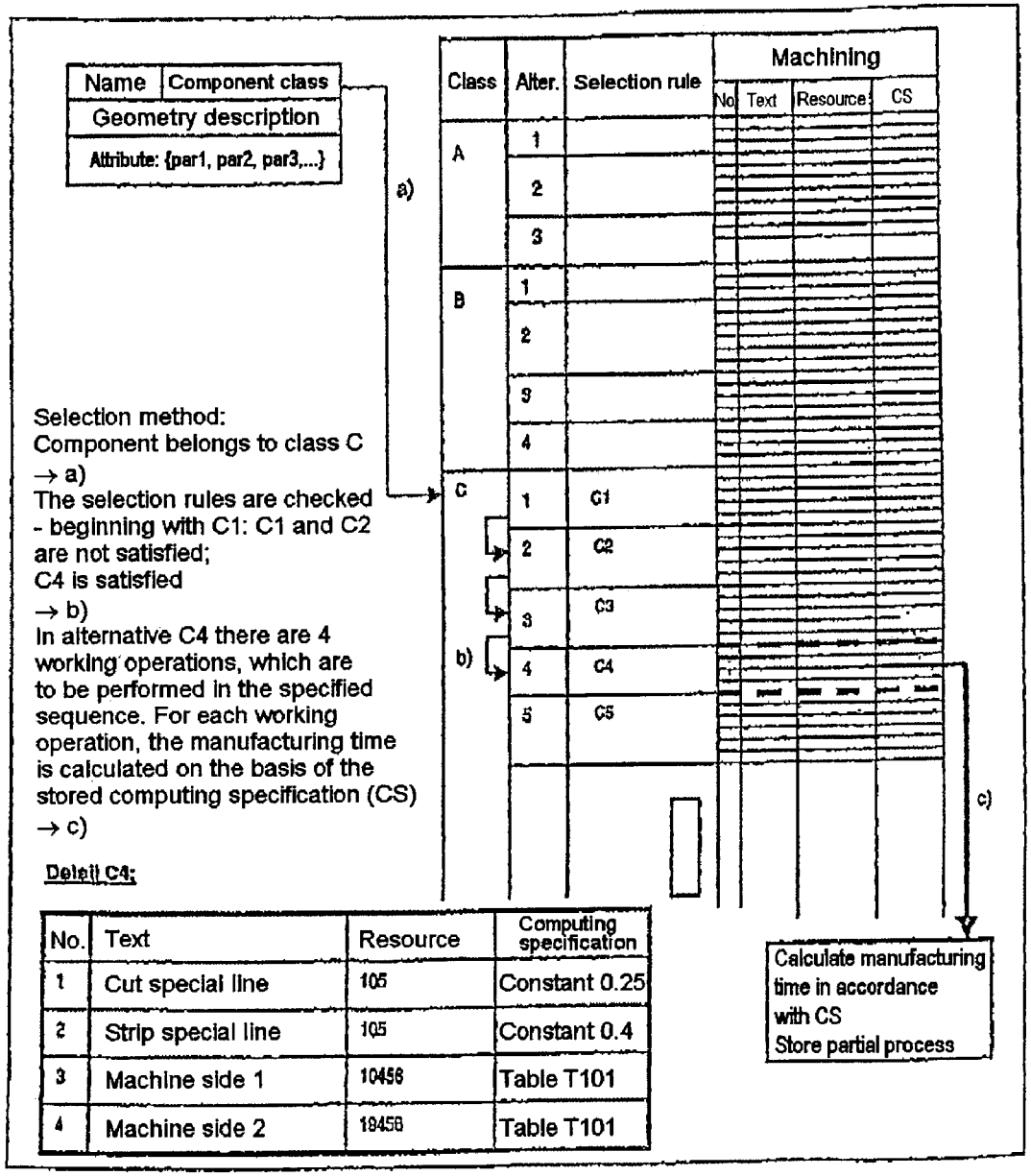

The flow diagrams shown in FIGS. 1 and 2 describe by way of example the automatic preparation of a working plan for producing a motor-vehicle wiring harness.

A product data model of a motor-vehicle wiring harness is provided. The product data model contains a partial data set for each component, each partial data set being assigned characteristics. The partial data sets are sequentially read out and processed with the assigned characteristics.

For this purpose, it has proven to be expedient in the present example to prepare a database divided into the following classes:
lines
special lines
connectors
bought-in parts or bought parts
splices
grommets
seals (=Seal) and the like.

The assignment of the selected partial data set to one of the classes takes place here on the basis of a machining-specific characteristic. The class "lines" contain, for example, as a machining-specific characteristic the characteristic "cutting". The selection between the classes "lines" and "special lines" is carried out by means of a further characteristic, for example "resistance" or "diameter".

Subsequently, the selection rules assigned to the respective class are compared with the partial data set. It is checked whether or not the selection rule is satisfied by the partial data set. If the selection rule is not satisfied, the next—more simply structured—selection rule is checked. As soon as a selection rule which the partial data set satisfies has been found, the associated sequence of working operations is selected. Then, the working time required for a working operation is calculated for each operation by means of the geometrical data contained in the partial data set. In this case, recourse is made to predetermined computing specifications for each working means or each resource. The computing specifications may be, in the simplest case, a constant, a formula or a table.

A partial manufacturing process broken down into individual working operations is output as the result. In this case, the working means respectively to be used and the required working time are specified.

All the partial manufacturing processes required for producing the product are ascertained one after the other. The partial manufacturing processes are provided with an index. Finally, an ordering of the partial manufacturing processes is performed on the basis of the index. The ordered partial manufacturing processes produce the working plan.

In FIG. 2, the selection of a partial manufacturing process is shown once again in detail. The assignment to a class, here the class "C", takes place on the basis of a characteristic contained in the product data model, which here comprises "name", "component class", "geometry description" and "attributes" (step a). Subsequently, the selection rules C1, C2, C3, etc. associated with the class are checked (step b). In the actual example, the selection rule C4 is satisfied for the partial data set checked. This selection rule is assigned a partial manufacturing process with four working operations. The manufacturing time is then calculated for each working operation on the basis of a computing specification stored for it.

The working operations, the resource to be used and the computing specification are represented once again in detail in the table at the bottom left in FIG. 2. It is evident that the working operation No. 1 concerns the activity "cutting special line", with resource No. "105" being used. For the operation of cutting, a constant "0.25" is provided as the computing specification for calculating the required working time.

I claim:
1. A method for automatically preparing a working plan for producing a product comprising a number of components, with the following steps:
   a) providing a product data model of the product, in which each component is described by a partial data set containing a classification characteristic,
   b) preparing a database, data sets contained therein being divided into classes according to a classification char- acteristic, each class containing one or more selection rules, each selection rule being assigned a partial manufacturing process provided with an index, and each partial manufacturing process containing one or more working operations,
c) automatically selecting a class applying to a component on a basis of the classification characteristic associated with the component,
d) automatically selecting a partial manufacturing process suitable for producing a component by means of a selection rule,
e) automatically establishing a sequence of the partial manufacturing processes on the basis of the respective indexes.

2. The method as claimed in claim 1, wherein the classification characteristic is a material-specific characteristic.

3. The method as claimed in claim 1, wherein geometrical data and characteristics contained in a partial data set are processed by a selection rule.

4. The method as claimed in claim 1, wherein partial manufacturing processes stored in the database are checked one after the other hierarchically with decreasing complexity for selection of a suitable partial manufacturing process.

5. The method as claimed in claim 1, wherein each partial manufacturing process comprises a number of manufacturing steps and an expenditure of time for a working step is calculated by means of data or a computing specification predetermined for each of the working steps.

6. The method as claimed in claim 1, wherein each partial manufacturing process is assigned at least one working means and a text.

7. The method as claimed in claim 1, wherein it is possible for a working plan showing the sequence of the partial manufacturing processes, working means required for the partial manufacturing processes, and an expenditure of time required for the respective partial manufacturing process to be output as a result on a screen, as a file or in printed form.

8. The method as claimed in claim 1, wherein transactions which simulate manual preparation of a working plan are derived automatically from ascertained partial manufacturing processes.

9. A device for data processing, wherein said device is adapted to carry out the method according to claim 1.

* * * * *